May 28, 1935.  H. H. KISTNER  2,002,606

PISTON

Filed June 3, 1932  2 Sheets-Sheet 1

Inventor

HERMAN H. KISTNER

Attorneys.

May 28, 1935.  H. H. KISTNER  2,002,606
PISTON
Filed June 3, 1932  2 Sheets-Sheet 2
Fig.5.
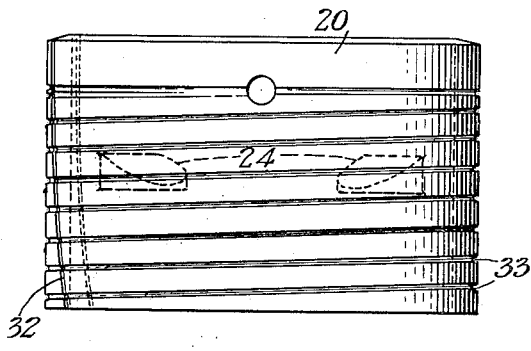
Fig.6.
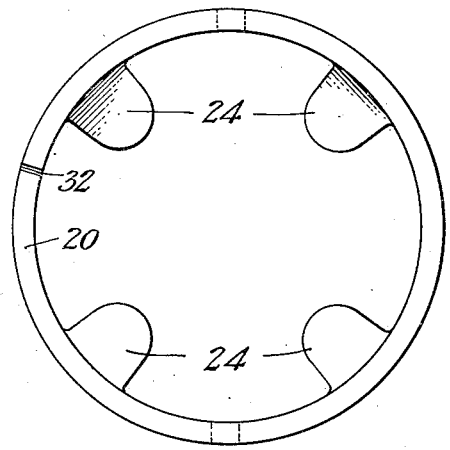
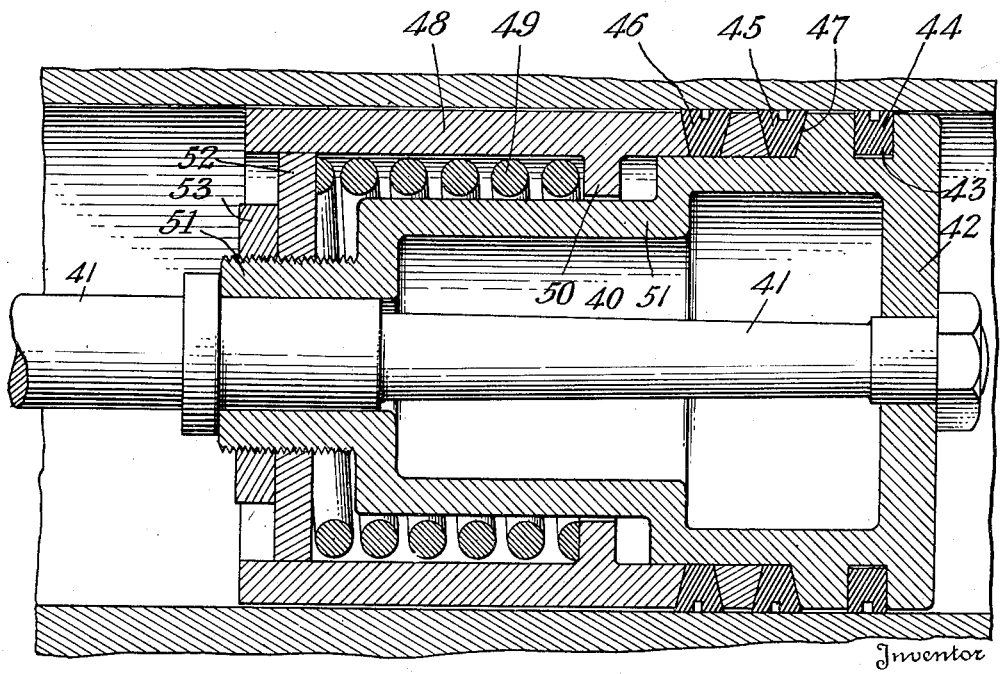
Fig.7.
Inventor
HERMAN H. KISTNER
Attorneys.

Patented May 28, 1935

2,002,606

UNITED STATES PATENT OFFICE 2,002,606

PISTON

Herman H. Kistner, Baltimore, Md.

Application June 3, 1932, Serial No. 615,189

16 Claims. (Cl. 309—15)

The present invention relates to improvements in pistons for motors, engines, pumps or the like and aims generally to improve pistons of the self-adjusting sleeve type as shown in my prior Patents Nos. 1,423,616, 1,437,977 and 1,538,120.

In pistons of the type shown in my prior patents above referred to wherein the piston rings surround the piston and are free to move longitudinally relatively to the piston body against the tension of a spring pressed sleeve, difficulty has been experienced in maintaining a tight seal between the rings and cylinder walls, under all conditions. When used in modern high compression internal combustion motors, for example, the uppermost ring receives the shock or pressure of the exploded or compressed charge as the case may be, forcing it away from the underside of the piston head, and permitting leakage of gas, and hence, loss of compression down past the rings. The efficiency of the motor is therefore somewhat reduced.

My present invention aims to overcome these objections, and others, by the provision of a shock absorbing ring fitted to the piston body and located beyond and independent of the guiding rings, and functioning in combination with the self-expanding sleeve type piston ring to reduce shock and increase power.

In order that the novel features of my invention may be fully understood, reference is had to the accompanying drawings and detailed description, illustrating various embodiments of my invention, wherein Fig. 1 is a side elevation of an internal combustion engine piston constructed in accordance with my invention, partly in section, longitudinally on the line 1—1 of Fig. 3;

Fig. 5 is a side elevation of the sleeve; and Fig. 6 is a bottom view thereof; and Fig. 7 is a sectional view of a modified form of piston adapted for use in steam and like engines constructed in accordance with my invention.

Figure 1:
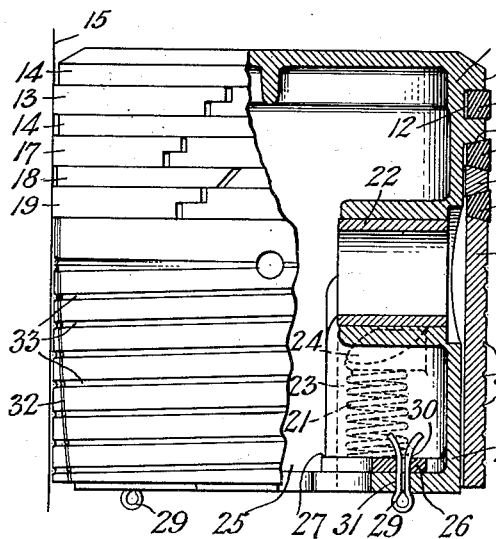
Figure 2:
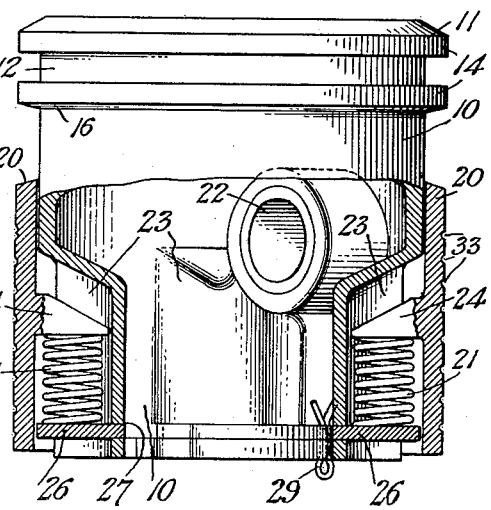
Fig. 2 is a side view of the same, partly in section taken on the line 2—2 of Fig. 3; with the rings removed, showing the manner of locking the sleeve member to the piston body.

In the internal combustion motor type of piston, illustrated in Figs. 1 and 2, the piston body 10 is of the trunk type and may be made of cast iron, aluminum alloys or other metals, suitable for the usual speeds of operation and particular type of work to be performed by the engine, or other device, and is advantageously formed with an enlarged head 11 at one end thereof, preferably the upper end, to receive the explosive force of the charge. The piston head 11 is advantageously formed with a ring groove 12, for the reception of an expansible shock absorbing ring 13, according to the invention. The piston body 10 is shaped on opposite sides of the ring groove to provide lands 14 of suitable width for the particular design and character of motor for which the piston is intended, the diameter of the piston body through these lands 14 being such as to provide a substantial clearance between their outer walls and the cylinder walls 15. The exact dimension of this clearance will vary with different motors, and will probably vary somewhat throughout a number of motors of the same bore dimensions, being determined to suit each size and speed of motor.

The under face of the lower land 14 is bevelled to incline inwardly and downwardly as at 16, to cooperate with a correspondingly inclined face of an inwardly tapered sealing ring 17. An oppositely disposed, outwardly tapering spacer ring 18 is fitted around the piston body, the upper face of which cooperates with the lower inclined face of sealing ring 17, and the lower face cooperates with the upper face of a second sealing ring 19. The lower face of the sealing ring 19 contacts with an outwardly and downwardly bevelled edge of a sleeve 20, loosely surrounding the piston body 10 and resiliently connected thereto (as by springs 21) in a manner to be more fully explained later, so that the sleeve 20 will hold the sealing rings 17 and 19 and the spacer ring 18 together and against the bottom face of land 14.

The angle of inclination of the bevelled faces of the bottom land 14 and rings 17, 18 and 19, as well as the upper face of the sleeve 20, will depend upon the particular use and work required of the piston, but it will be calculated in conjunction with the tension of the springs 21 connecting the piston body and sleeve so as to exert a predetermined pressure of the rings 17 and 19 against the cylinder wall 15. Obviously the width of the lands 14 and spacer ring 18 may be varied within wide limits to suit the particular design of engine, the purpose being to provide spaced sealing areas between the sealing rings 17 and 19 and the cylinder wall by means of which the piston may be properly guided and centered in the cylinder. By proper calibration of the springs 21 there will be set up a uniform pressure on the rings 17 and 19 through the sleeve 20 and spacer ring, which by reason of the tapered faces of the rings exerts a uniform outward pressure of the rings against the cylinder walls which pressure is maintained even though wear occurs in the rings 17 and 19 or in the cylinder.

The shock of the exploded or compressed charge being received by the shock absorbing piston ring 13 prevents gases of high pressure from reaching the sealing rings, thereby avoiding leakage of gases past these sealing rings from the inside thereof as well as repeated hammering on the sealing rings and consequent repeated compression and expansion of the springs 21 which are apt to destroy their predetermined compression.

According to one embodiment of the invention, the piston body may be a suitable casting, providing an enlarged head 11 and a reduced body formed with wrist pin bearings 22 as is usual. Intermediate the wrist pin bearings 22 the body 10 is formed with a plurality of inwardly extending, outwardly opening recessed portions 23 extending below the wrist pin bearings and being preferably open at their lower ends (see Fig. 2). As stated above, the sleeve 20 is positioned around the body portion of the piston body, and preferably is formed with inwardly extending lugs 24 positioned within the upper ends of the recessed portions 23 against which the springs 21 bear to urge the sleeve upwardly in a direction to be effective in expanding the sealing and guiding rings outwardly against the cylinder wall.

In the design shown there are four of these pockets or recessed portions 23, located preferably one on each side of and closely adjacent to each of the wrist pin bearings, permitting an unrestricted open end 25 of the piston body adequate to accommodate the oscillating motion of the connecting rod (not shown).

Figure 3:
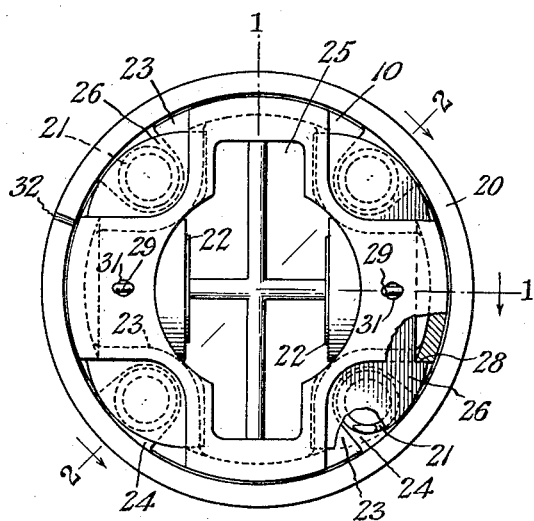
Fig. 3 is a bottom plan view of the piston.
Figure 4:
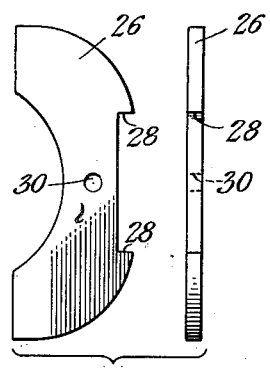
Fig. 4 is a detail side and edge view of one of the locking keys.

The recessed portions 23 (housing the springs 21) may advantageously be arranged in pairs (see Fig. 3) to enable the simplification of the means for locking the springs 21 in place. According to a preferred form of the invention, suitable locking keys or plates, 26, one shaped to cover each pair of recessed portions 23, are insertible within the piston body through slots 27 in the inner walls of the recessed portions. The keys 26 are preferably provided with central notched portions 28 adapted to engage the restricted side wall of the piston body between the recessed portions 23, so as to prevent relative lateral shifting thereof. Additional locking of the keys each in its proper operative position may be effected by means of a cotter pin 29 extending through the openings 30 and 31 in the keys and bottom flange of the piston body respectively.

The sleeve 20 advantageously may be split spirally lengthwise as at 32 (Figs. 1, 3, 5 and 6) in order that it may not be so distorted due to the heat of the engine, as to exert variable pressures on the sealing rings. When used in internal combustion engines or other heat engines, the outer face of the sleeve may be grooved, as at 33, for the reception of oil or suitable lubricant. By the provision of the spaced sealing and guiding rings and the shock absorbing ring, the sleeve 20 may have a substantial and constant clearance with the cylinder wall, and a substantial amount of lubrication may therefore be supplied to the cylinder wall through the oil grooves 33 as conditions require.

As stated above, my invention is applicable generally to various types of engines, motors, and pumps employing a reciprocating piston, and in Fig. 7 I have illustrated my invention applied to a steam engine or other large diameter piston. In this embodiment of the invention the piston body 40 may be hollow, for lightness, to receive a piston rod 41, as is usual. The piston head 42 may be slightly smaller than the cylinder and grooved (as at 43) to receive the head end shock absorbing ring 44 as in the case of the type of piston illustrated in Fig. 1. Two or more sealing and spacer rings 45 and 46, respectively, may be employed, having oppositely sloping side walls and retained in place on the body of the piston against the inclined side 47 of the head by a sleeve 48, as above explained. This sleeve is mounted to slide axially on the piston body, and is normally held in place by a large helical spring 49 which presses against an internal flange 50 near the head end of the sleeve. In order to simplify the manner of connecting the sleeve 48 to the piston body 40, as well as to provide means for adjusting the tension of its associated spring 49 and regulate the degree of pressure of contact between the sealing rings and cylinder wall as desired, I provide an extension 51 on the inner end of the piston body away from its head of reduced diameter to afford space for the spring 49 and flange 50. Preferably the inner end of the piston body is further reduced in diameter to fit the piston rod 41 and is threaded to receive an adjusting nut or ring 52 and lock nut 53, the former being adapated to engage and support one end of the spring to retain it in adjusted position. By this simplified construction, as is apparent, the parts of the piston may be readily assembled, and further, the tension of the spring may be adjusted to suit the particular work required of the piston.

From the above it will be clear that I have materially improved the type of piston referred to so that its predetermined characteristics of design may be maintained throughout its life. Obviously the number and spacing of the guiding rings may be varied to suit the particular use for the piston, and one or more shock absorbing rings may be used without departing from the spirit of my invention.

Furthermore, the provision of the shock absorbing ring in combination with the expanding positioning and guiding rings, avoids the transmission of explosive gases upon the guiding rings, and consequent compression and expansion of the springs, permitting the springs 21 to float freely with the piston without repeated compression and expansion which would have the tendency quickly to crystalize the metal of the springs. Accordingly, the springs may be adjusted and calibrated to exert the desired pressure of the guiding rings against the cylinder wall, which pressure will remain substantially constant throughout the operation of the piston.

Advantages of my invention reside in the improvement of pistons generally, enabling the positioning and guiding rings to contact with the cylinder walls under a uniform pressure, which pressure will not be greatly varied by the force of the explosive or compressive charge. My present invention, therefore, combines all of the advantages of my earlier patents above mentioned, and permits these advantages to be maintained in modern high compression engines. By the present construction uniform contact is maintained between the guiding rings and cylinder walls, and as the guiding rings carry and balance the piston body, piston slap in the engine is avoided, gas leakage into the crank case, and oil leakage into the combustion chamber is avoided. The wrist pin may be full floating in the piston without danger of scoring the cylinder.

Other numerous advantages of the invention, both from the standpoint of engine performance as well as of manufacture and repair, will be apparent to those skilled in the art.

I claim:

1. A piston assembly comprising a piston body having a head, a plurality of spaced sealing and guiding rings completely surrounding the body portion of said piston means for resiliently connecting the rings to the piston body and for maintaining each of said rings under uniform predetermined tensions, and shock absorbing ring means carried by said piston body and independent of said sealing and guiding rings for absorbing the explosive or compressive force of the charge.

2. A piston assembly comprising a body having an enlarged head, a plurality of spaced sealing and guiding rings surrounding said body and bodily movable relatively thereto, means for resiliently connecting the rings to the piston body and for maintaining each of said rings under uniform predetermined tensions and shock absorbing ring means carried by said piston body for receiving the explosive or compressive force of the charge independently of said sealing and guiding means.

3. A piston assembly comprising a body having an enlarged head, a plurality of expansible sealing and guiding means movably connected to said piston for contacting with the cylinder walls and maintaining the piston body in axial position relative thereto, means for resiliently connecting the rings to the piston body and for maintaining each of said rings under uniform predetermined tensions, and a shock absorbing piston ring carried by the piston body independently of said sealing and guiding rings.

4. A piston assembly comprising a piston body having an enlarged head, a plurality of sealing and guiding rings surrounding said piston and bodily movable with reference thereto, means resiliently connecting said piston body and rings together and for causing said rings to bear against the cylinder walls under uniform predetermined pressures, and a shock absorbing piston ring carried by said piston head for receiving the explosive or compressive force of the charge independently of said sealing and guiding rings.

5. A piston assembly as defined in claim 4 characterized by the provision of means for adjustably varying the pressure of said rings against the cylinder walls.

6. A piston assembly comprising a piston body having an enlarged head and a smaller body, a ring groove formed in said head, an expansible piston ring fitted in said groove, positioning and guiding means surrounding said body including spaced contact rings and a sleeve member resiliently connected to said piston body and adapted to exact a predetermined expanding pressure on said rings, said expansible piston ring being independent of said positioning and guiding means, whereby the predetermined pressure of the latter is undisturbed by the explosive or compressive force of the charge, which is received by the expansible piston ring.

7. A piston assembly as defined in claim 6 wherein the sleeve member is connected to the piston body by one or more coil spring members positioned between the sleeve members and piston body.

8. A piston assembly as defined in claim 6 characterized by the provision of spring members for connecting the sleeve member to the piston body and means for adjustably varying the tension of the spring members to vary the outward pressure of the positioning and guiding rings against the cylinder wall.

9. A piston assembly comprising a piston body, a plurality of sealing and guiding rings surrounding said piston body and adapted for contact with the cylinder wall, means for connecting said sealing and guiding rings and piston body together so that said piston body is floatingly associated with said rings and the rings are maintained under uniform radial tensions, and shock absorbing ring means carried by said piston for receiving the explosive or compressive force of the charge independently of the sealing and guiding rings.

10. A piston assembly comprising a piston body having a head and reduced body portion, combined sealing and guiding means slidably mounted around and encasing substantially all of said reduced body portion including a sleeve member resiliently connected to said piston body, and a compressive absorbing piston ring mounted in said piston head for receiving the shock of the charge independently of the sealing and guiding rings, whereby the contact pressure between said sealing and guiding rings and cylinder wall may remain constant.

11. A piston assembly comprising a piston body having an enlarged head, and means for guiding said piston body in its cylinder comprising a plurality of spaced sealing and guiding rings, means for resiliently connecting said rings to the piston body and for expanding said rings against said cylinder wall under uniform predetermined tensions, and a shock absorbing piston ring carried by said piston head and arranged to receive the moving force of the charge independently of the sealing and guiding rings.

12. A piston assembly for high speed heat engines, comprising a hollow piston body having an enlarged head, means for positioning and guiding said piston body within its cylinder comprising a plurality of spaced rings surrounding said body and mounted for body movement relative thereto, means resiliently connected to said piston body and having constant and substantial clearance from said cylinder wall for maintaining said rings in position and causing each of them to exert a uniform predetermined pressure against said cylinder wall, said piston head being formed with a ring groove above said positioning and guiding rings, and an expansible piston ring positioned within said groove for receiving the moving force of said piston independently of said positioning and guiding rings.

13. A piston assembly comprising a piston body having an enlarged head and wrist pin bearings on opposite sides thereof, a plurality of longitudinally extending, outwardly opening recesses formed in said piston body and extending below the wrist pin bearing, said recesses being arranged in pairs on opposite sides of said bearing permitting an unrestricted opening in the bottom of the piston transversely of said bearings, a shock absorbing piston ring carried by said head, positioning and guiding means surrounding the body portion of the piston including expansible rings and a sleeve member, and spring means housed within said recesses for resiliently connecting said sleeve to said piston body and for exerting a uniform outward pressure of said positioning and guiding rings against the cylinder wall.

14. A piston assembly comprising a piston body having an enlarged head, a plurality of spaced positioning and guiding rings surrounding the piston adapted for sealing engagement with the cylinder walls, means floatingly connecting said rings to said piston body and for exerting a uniform outward pressure on each of said rings into engagement with the cylinder walls whereby said rings will be floatingly associated with said piston body, and separate shock absorbing ring means carried by the piston head for receiving the compressive or explosive force of the charge whereby the contact pressure between said rings and cylinder wall may remain constant.

15. A piston assembly comprising a piston body having an enlarged head, a plurality of spaced positioning and guiding rings surrounding the piston adapted for sealing engagement with the cylinder walls, means floatingly connecting said rings to said piston body and for exerting a uniform outward pressure on each of said rings into engagement with the cylinder walls whereby said rings will be floatingly associated with said piston body, and an independent shock absorbing ring carried by the piston head for receiving the compressive or explosive force of the charge whereby the contact pressure between said rings and cylinder wall may remain constant.

16. A piston assembly comprising a piston body having an enlarged head, a plurality of spaced positioning and guiding rings surrounding said piston body spaced from said piston body and bodily movable relative thereto for positioning and guiding said piston during its reciprocations in its cylinder, means for resiliently connecting said rings to said piston body and for mantaining said rings under uniform predetermined pressures, and a separate shock absorbing piston ring carried by said piston head.

HERMAN H. KISTNER.